3,409,504
NUCLEAR FUEL ELEMENT

Henri Bailly, Orsay, Bernard Francois, Grenoble, and Lucienne Meny, Paris, France, assignors to Commissariat a l'Energie Atomique, Paris, France
No Drawing. Filed Jan. 24, 1967, Ser. No. 611,228
Claims priority, application France, Feb. 2, 1966, 48,174; Dec. 21, 1966, 88,412
4 Claims. (Cl. 176—82)

ABSTRACT OF THE DISCLOSURE

A fuel element formed of a ceramic material having an actinide oxide base and contained in a can formed of zirconium or zirconium alloy. An intermediate layer formed of a metallic nitride, especially of titanium and/or niobium, is located between the base and the can.

---

This invention is directed to a fuel element for nuclear reactors as well as to a method of fabrication of said element or any like element. The invention is more specifically concerned with fuel elements formed of a ceramic material having an actinide oxide base and contained in a can of zirconium or zirconium alloy.

One example of a ceramic reactor fuel is uranium dioxide $UO_2$. In the majority of cases, this fuel material is prepared in the form of a stack of pellets which are fitted inside a can but it can also be produced in the form of a single rod. The rods or pellets are usually prepared by sintering from an oxide powder.

It has been observed that, during the temperature rise which accompanies initial irradiation of fuel elements of this type, there takes place a diffusion of oxygen which migrates from the fuel material into the zirconium or zirconium alloy can and results in embrittlement of the can. By way of example, the percentage of oxygen atoms contained in the crystal lattice structure of a zirconium alloy could attain approximately 30%.

The object of this invention is to prevent the abovementioned migration of oxygen from the fuel by preventing any contact between the fuel and the zirconium can.

The invention accordingly relates to a fuel element comprising a ceramic material having a base of actinide oxide and contained in a can formed of zirconium or zirconium alloy and additionally comprising between the fuel and the can a continuous intermediate layer which is formed of a metallic nitride.

According to a first form of execution of the invention, said intermediate layer is formed of titanium nitride. A layer of the order of $2\mu$ already provides an effective barrier to the migration of oxygen. However, a thickness of less than $12\mu$ approximately is sufficiently small not to constitute an obstacle when using the fuel element in a nuclear reactor.

In accordance with another form of execution of the invention, the continuous intermediate layer which is formed between the fuel and the can is constituted by niobium nitride. The thickness of said layer is advantageously at least equal to $2\mu$.

The advantage of niobium nitride over titanium nitride lies in the fact that it has a smaller neutron capture cross-section, namely 1.5 barns in the case of niobium nitride instead of 3.4 barns in the case of titanium nitride. The incidence of the intermediate metallic nitride layer during irradiation of the fuel element in a nuclear reactor is therefore reduced still further.

According to another form of execution of the fuel element which is contemplated by the present invention, a bond is more readily formed between the metallic nitride layer and the fuel material by forming said layer of a mixed nitride of niobium and titanium, wherein the proportion of titanium nitride is preferably at least equal to 15%.

This invention is also concerned with a method of fabrication of the fuel element which comprises preparation of a fuel material having an actinide oxide base, cladding of said material with zirconium or with a zirconium alloy and, in addition, prior to the cladding operation, application on the fuel material of at least one metal such as titanium and/or niobium or of a compound of said metal and heating of the element obtained in an atmosphere of nitrogen and hydrogen at a temperature and for a period of time which are sufficient to result in nitriding of the metal. In the case, for example, in which the metal employed is titanium, the temperature is comprised between 1000 and 1500° C. and preferably of the order of 1200° C.

In the case which most frequently arises in which the fuel material is prepared by sintering an oxide powder (such as $UO_2$) by heating to a temperature between 1300 and 1700° C., it is of particular interest, in accordance with a secondary feature of the method according to the invention, to carry out in a single operation both the nitriding process which produces a surface coating and the sintering of the fuel.

The method according to the invention accordingly comprises cold pressing of a fuel powder having a base of actinide oxide in the form of compact articles, application on said articles of a metal such as titanium and/or niobium or of a compound of said metal, and heating of said coated articles in a nitrogen and hydrogen atmosphere up to a temperature within the range of 1300 to 1700° C. The heating operation is continued for a sufficient period of time to effect the nitriding of the coating metal and the sintering of the fuel material.

The application on the fuel material of the metal which may be in the form of a compound such as a halide or preferably an oxide can be performed, for example, by projecting with a spray-gun, by enamelling, painting, dipping or any other conventional method.

The nitrogen or hydrogen atmosphere in which the sintering process is performed can be, for example, cracked ammonia.

Examples of execution of the method according to the invention will now be described hereunder without any limitation being implied.

EXAMPLE 1

A powder of $UO_2$ is compacted under a pressure of 4 t./cm.$^2$ so as to obtain $UO_2$ pellets having a density of 55% of theoretical. Titanium dioxide $TiO_2$ in finely divided form (particle size of less than $1\mu$) is projected onto said pellets by means of a spray-gun. The quantity of $TiO_2$ is, for example, 0.70 mg. for a surface area of 1 cm.$^2$.

The pellets which are coated with $TiO_2$ are then introduced in a sintering furnace and heated in a nitrogen atmosphere containing 40% by volume of hydrogen. The temperature rise takes place, for example, at a rate of 400° C. per hour with a level tempertaure stage of one hour at 1200° C. and another level temperature stage of four hours at 1600° C. The furnace is then allowed to cool.

$UO_2$ pellets of approximately 94% of theoretical density are thus obtained. These pellets are covered with a uniform layer of titanium nitride which forms a very satisfactory bond with the $UO_2$ fuel as a result of the surface diffusion of the uranium oxide.

In order that the layer of titanium nitride should be both continuous and afford a satisfactory bond, it is usually sufficient to ensure that the thickness of the layer is greater than approximately two microns. However, even thicknesses of an appreciably higher order would still remain sufficiently small not to impair the performance of fuel elements in a nuclear reactor.

The fuel pellets which are coated in the manner described are then fitted within a zirconium can or a can fabricated of zirconium-copper alloy, for example, in accordance with conventional practice.

As will be apparent, the metallic nitride coating can be applied on the fuel material after sintering of the fuel and subsequent machining of the pellets obtained by sintering.

EXAMPLE 2

A $UO_2$ powder is compacted under a pressure of 4 t./cm.$^2$ so as to obtain $UO_2$ pellets having a density of 55% of the theoretical. Niobium oxide $Nb_2O_5$ in finely divided from (particle size of less than $1\mu$) is projected by spray-gun onto said pellets. The quantity of $Nb_2O_5$ is, for example, 1 mg. per cm.$^2$ of surface.

The pellets which are thus coated with $Nb_2O_5$ are then introduced in a sintering furnace and heated in a nitrogen atmosphere containing 40% by volume of hydrogen. The temperature rise takes place, for example, at a rate of 400° C. per hour with a level temperature stage of one hour at 1200° C. and another level temperature stage of four hours at 1600° C. The furnace is then allowed to cool.

The $UO_2$ pellets which are obtained in this manner have a density which is approximately 94% of theoretical and are coated with a uniform layer of niobium nitride which is effectively bonded to the $UO_2$ fuel.

When the pellets obtained are then introduced within a can made of a zirconium alloy such as a zirconium-copper alloy so as to constitute a fuel element, the thickness of the niobium nitride layer which is thus formed and which is of the order of $4\mu$ is sufficient to prevent the attacking action of the fuel on the cladding, even at the high temperatures which prevail in nuclear reactors.

By way of alternative, the adhesion of the deposit which is finally obtained can be further improved by carrying out the sintering operation in two successive stages. During a first stage, the pellets which are coated with niobium oxide are heated in a hydrogen atmosphere, the temperature being increased from room temperature to 1400° C. at the rate of 400° C. per hour.

The heating temperature is then maintained at a level stage of 1400° C. for a period of one hour during which a progressive change occurs in the sintering atmosphere, part of the hydrogen being replaced by nitrogen. The second sintering stage is performed in a nitrogen atmosphere containing 40% hydrogen by volume. The temperature rises from 1400° C. to 1600° C. and a level stage is maintained at 1600° C. for a period of four hours.

EXAMPLE 3

A uranium dioxide powder is compacted under a pressure of 4 t./cm.$^2$ so as to obtain specimens having a density of 55% of theoretical. A mixture of 50% by weight, for example, of $TiO_2$ and $Nb_2O_5$ in a finely divided state (particle sizes of less than $1\mu$) is projected onto said specimens by spray-gun; the quantity of oxide is, for example, 1 mg. per cm.$^2$ of surface.

The pellets which are thus coated with $TiO_2+Nb_2O_5$ are sintered in a nitrogen atmosphere containing 40% by volume of $H_2$. A temperature cycle is then performed which comprises a rise of 400° C./h., a stationary period of one hour at 1200° C., a further temperature rise and a second stationary period of 4 hours at 1600° C. Cooling is effected over a period of approximately two hours. However, it should be noted that the level temperature conditions which have just been indiciated are not usually complied with a cases when the temperature rise takes place at a slower rate.

$UO_2$ pellets of 94% of theoretical density are obtained and are coated with a layer of $(Ti+Nb)N$ which is bonded to the $UO_2$ fuel as a result of diffusion at the surface of the $UO_2$.

The thickness of the nitride layer varies between 2 and $3\mu$, and is such that the $(Nb+Ti)N$ barrier effectively prevents any reaction between the $UO_2$ and zirconium-copper alloy.

By way of alternative, the nitride layer can be applied on the fuel material after sintering of the fuel and subsequent machining of the pellets which are obtained by sintering. In order to effect the nitriding of a niobium oxide layer to which titanium oxide may or may not be added, it is merely necessary in such a case to heat the fuel element to a temperature within the range of 1000° C. to 1500° C., and preferably of the order of 1400° C., in a nitrogen atmosphere.

In addition, the nitride layer can also be obtained by pyrolysis between 600 and 1200° C. of a metal chloride in the presence of a mixture of $NH_3$ or $N_2+N_2$.

What we claim is:

1. A nuclear fuel element comprising a body of ceramic material having an actinide oxide base, a can of zirconium or a zirconium-base alloy enclosing said body, and an intermediate layer of a refractory metal nitride between said can and said body bonded to said body whereby oxidation of said can by said material is prevented.

2. A nuclear fuel element as described in claim 1, said metal being titanium or niobium.

3. A nuclear fuel element as described in claim 1, said intermediate layer having a thickness of at least two microns.

4. A nuclear fuel element as described in claim 1, said layer being a mixed nitride of about half titanium and half niobium.

References Cited

UNITED STATES PATENTS

| | | | |
|---|---|---|---|
| 2,990,351 | 6/1961 | Sanz et al. | 176—82 X |
| 3,166,614 | 1/1965 | Taylor | 176—91 X |
| 3,291,700 | 12/1966 | Brossa et al. | 176—82 |
| 3,304,235 | 2/1967 | Granata et al. | 176—82 |

CARL D. QUARFORTH, *Primary Examiner.*

M. J. SCOLNICK, *Assistant Examiner.*